(12) United States Patent
Taylor

(10) Patent No.: US 8,349,056 B2
(45) Date of Patent: Jan. 8, 2013

(54) SYSTEM AND METHOD FOR REDUCTION OF MOISTURE CONTENT IN FLUE GAS

(75) Inventor: Robert Warren Taylor, Ponte Vedra Beach, FL (US)

(73) Assignee: General Electric Company, Schenectady, NY (US)

(*) Notice: Subject to any disclaimer, the term of this patent is extended or adjusted under 35 U.S.C. 154(b) by 533 days.

(21) Appl. No.: 12/503,639

(22) Filed: Jul. 15, 2009

(65) Prior Publication Data

US 2011/0011262 A1 Jan. 20, 2011

(51) Int. Cl.
*B01D 53/14* (2006.01)

(52) U.S. Cl. ............ 95/179; 95/211; 95/214; 95/231; 96/243; 96/295

(58) Field of Classification Search .......... 95/45, 52, 95/151, 231, 178–179, 193–194, 209–211; 96/4, 8, 262, 234, 242, 281, 290, 295–296
See application file for complete search history.

(56) References Cited

U.S. PATENT DOCUMENTS

| | | | | |
|---|---|---|---|---|
| 3,953,566 A * | 4/1976 | Gore | ............................. | 264/505 |
| 3,962,153 A * | 6/1976 | Gore | ............................. | 521/79 |
| 4,125,563 A * | 11/1978 | Boschan | ....................... | 568/424 |
| 4,737,325 A * | 4/1988 | Kamiyama et al. | .......... | 264/45.1 |
| 5,281,254 A * | 1/1994 | Birbara et al. | .................... | 95/44 |
| 5,539,072 A * | 7/1996 | Wu | ............................... | 526/304 |
| 6,074,738 A * | 6/2000 | von Fragstein et al. | ... | 428/315.9 |
| 6,579,343 B2 * | 6/2003 | Brennecke et al. | ............... | 95/51 |
| 6,666,906 B2 * | 12/2003 | Hallman | .......................... | 95/52 |
| 7,153,472 B1 * | 12/2006 | Bronshtein | .................... | 422/41 |
| 7,381,331 B2 * | 6/2008 | Duong et al. | ............ | 210/500.42 |
| 7,828,880 B2 * | 11/2010 | Moriya et al. | .................. | 95/210 |
| 2005/0265911 A1 * | 12/2005 | Yuan | ............................ | 423/220 |
| 2007/0256559 A1 * | 11/2007 | Chen et al. | ....................... | 95/169 |
| 2010/0024651 A1 * | 2/2010 | Bansal | ............................. | 96/13 |

* cited by examiner

*Primary Examiner* — Duane Smith
*Assistant Examiner* — Ives Wu
(74) *Attorney, Agent, or Firm* — Fletcher Yoder

(57) ABSTRACT

A system includes a direct contact absorber configured to circulate a flow of a liquid desiccant solution for absorbing moisture from a gas stream flowing through the direct contact absorber.

21 Claims, 5 Drawing Sheets

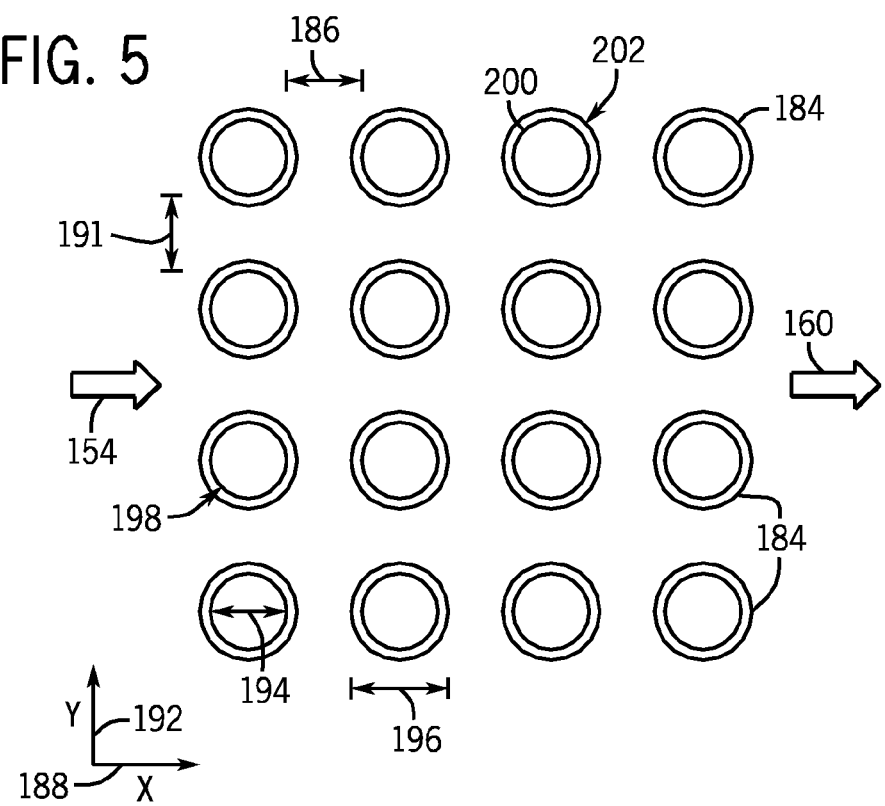
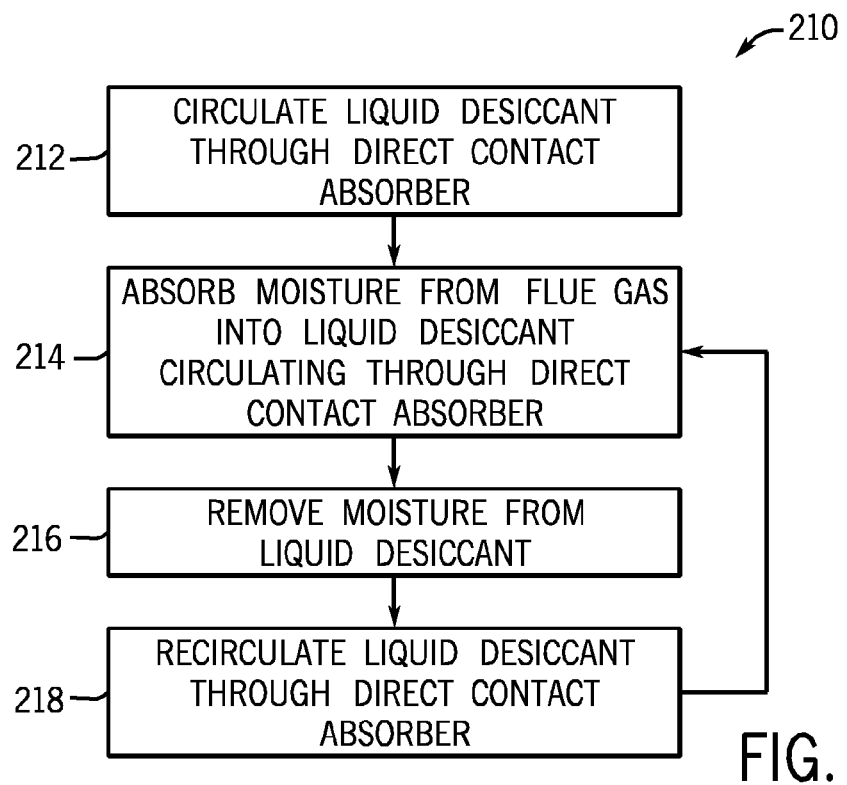

SYSTEM AND METHOD FOR REDUCTION OF MOISTURE CONTENT IN FLUE GAS

BACKGROUND OF THE INVENTION

The subject matter disclosed herein relates generally to systems and method for reducing the moisture content in flue gas, such as flue gas produced by a power generation system.

Power generation systems may generate power using a number of different techniques, such as by using boilers, furnaces, or turbine-based power producing components, or some combination thereof. Such power generation systems may generally provide a large continuous supply of water to various components, such as for cooling purposes. Thus, the ability to maintain continuous operation of a power generation system may depend at least partially upon whether water consumption requirements can be met. Further, in some power generation systems, a flue gas produced by one or more power generation components may be at least partially saturated with water. Depending upon the degree of water saturation, the flue gas may leave a visible plume (which may be generally undesirable) as it exits the power generation system, such as through a stack. Additionally, the efficiency of certain processes within the power generation system, such as those associated with $CO_2$ separation, may be reduced when there is water present in the flue gas stream.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a direct contact absorber. The direct contact absorber is configured to circulate a flow of a liquid desiccant solution for absorbing moisture from a gas stream flowing through the direct contact absorber.

In a second embodiment, a system includes a component configured to produce an exhaust flow into a flue. The system further includes a liquid desiccant solution. Additionally, the system includes a direct contact absorber having a plurality of hollow tubes, wherein the liquid desiccant solution flows through each of the plurality of hollow tubes to remove moisture from the exhaust flow.

In a third embodiment, a method includes flowing a gas stream through a direct contact absorber. The method further includes circulating a liquid desiccant solution through the direct contact absorber. Additionally, the method includes absorbing moisture from the gas stream via the liquid desiccant solution.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a cross-section view of the plurality of hollow tubes taken along cut-line 5-5 of FIG. 4; and FIG. 6 is a flow chart depicting a method for removing moisture from a flue gas stream, in accordance with an embodiment of the present technique.

DETAILED DESCRIPTION OF THE INVENTION

Figure 1:
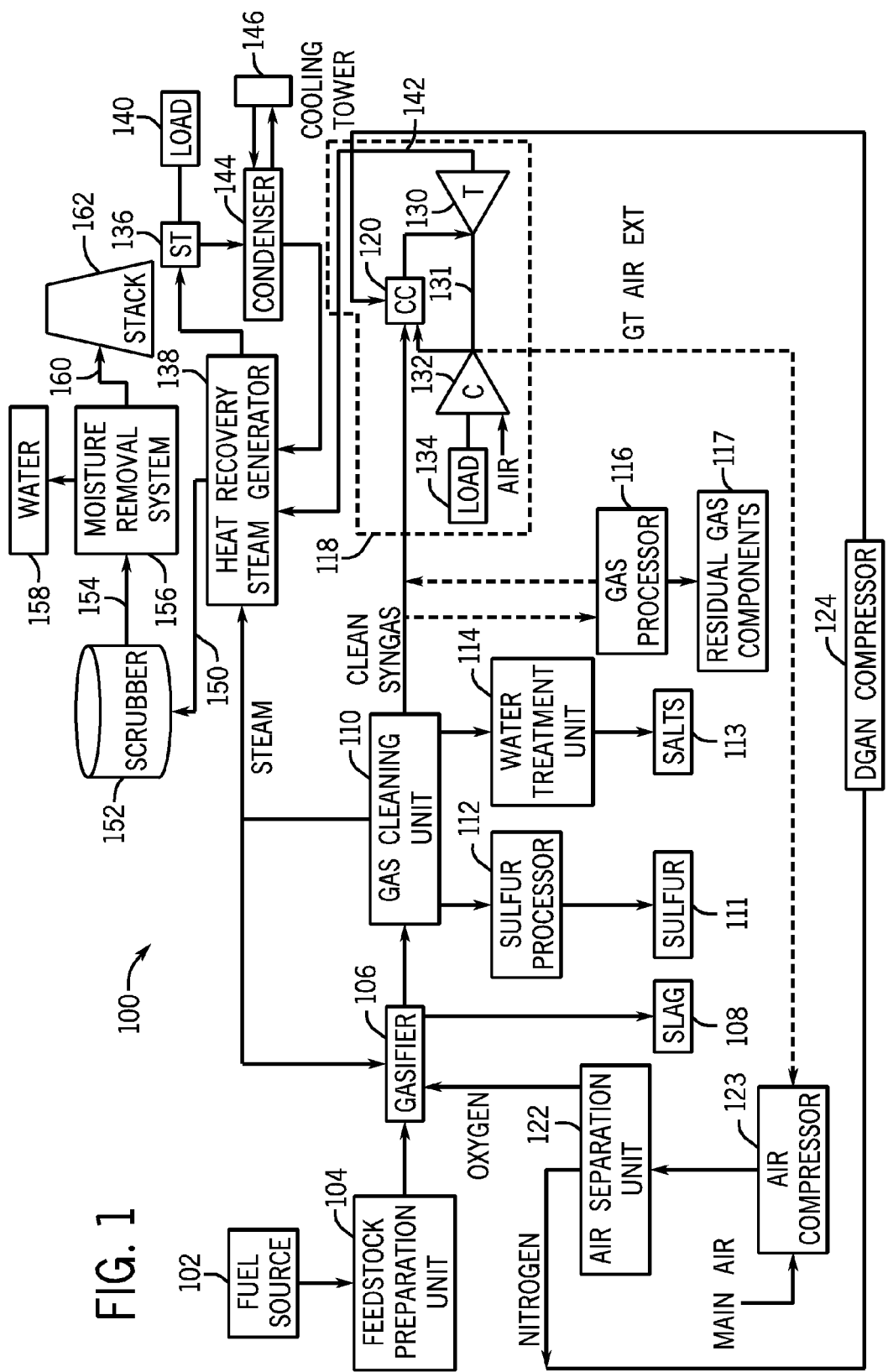
FIG. 1 is a schematic block diagram of an integrated gasification combined cycle power generation plant that may include a water reduction system, in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

As mentioned above, the efficiency of certain processes within the power generation system, such as those associated with $CO_2$ separation, may be reduced when there is water present in the flue gas stream. Further, the flue gas may become saturated with moisture, such as when processed by a wet scrubbing system for removal of certain particulates. Depending upon the degree of water saturation, the flue gas may leave a visible plume as it exits the power generation system (e.g., through a stack), an effect which is generally undesirable. Still further, power generation systems may generally rely upon a large continuous supply of water or cooling fluids for cooling purposes. As such, the operation of a power generation system for power production may depend greatly upon whether the continuous supply of cooling fluid (e.g., water) is available.

Accordingly, the disclosed embodiments are directed to systems and methods for removing water from flue gas produced in a power generation system. Certain embodiments may provide for the circulation of a liquid desiccant through a direct contact absorber. For instance, in one embodiment, the direct contact absorber may include a plurality of hollow tubes perforated with a plurality of microscopic openings. The hollow tubes may be formed using a hydrophilic material. For example, the hollow tubes may include a porous membrane that includes a plurality of microscopic openings which are small enough to prevent a liquid (e.g., the liquid desiccant) from passing through, but may still allow vapor molecules (e.g., water vapor in a flue gas stream) to pass through. By way of example only, the hollow tubes may be formed using expanded polytetrafluoroethylene (e.g., Teflon®, available from E. I. du Pont de Nemours and Company (DuPont) of Wilmington, Del.).

As the flue gas flows through the direct contact absorber, water molecules within the flue gas stream may pass into the hollow "absorption" tubes and be absorbed by the liquid desiccant circulating therethrough. The liquid desiccant, which is now saturated with water absorbed from the flue gas stream, may be processed by a regeneration system for recovery of the absorbed water, which may then be "recycled" and supplied back to the power generation system (e.g., for use as a cooling fluid). As used herein, the term "dry liquid desiccant" should be understood to mean that the liquid desiccant is in a non-saturated state (e.g., just after regeneration and/or prior to absorption), and the term and "wet liquid desiccant" should be understood to mean that the liquid desiccant is in a saturated state (e.g., due to water absorption from the flue gas). By utilizing the direct contact absorber and liquid desiccant cycle of the presently disclosed techniques, certain drawbacks associated with other moisture removal techniques, such as corrosion of system components due to the direct spraying of liquid desiccant directly into the flue gas stream (or intake gas stream), may generally be avoided.

Meanwhile, the processed flue gas exiting the direct contact absorber, which may have a reduced moisture content relative to the flue gas entering the direct contact absorber, may exit the power generation system through a stack. Due to the reduced moisture content in the exiting flue gas stream, the visibility of a plume may be reduced of substantially minimized. Additionally, while the present embodiments generally focus on the removal and recovery of water from the flue gas, it should be understood that, in other embodiments, the direct contact absorber may also be configured to remove other elements, such as mercury, $SO_2$, or HCl, and may also be applied to other gas streams, such as an intake gas stream.

With the foregoing in mind, FIG. 1 is a schematic block diagram showing an embodiment of a power generation plant 100. The illustrated power generation plant 100 may be an integrated gasification combined cycle (IGCC) system 100 that may produce and burn a synthetic gas, i.e., syngas. As discussed below, the system 100 may employ a moisture removal system (e.g., 156) configured to remove moisture (e.g., water) from a flue gas stream produced by one or more power components of the system 100. The moisture removal system may utilize a direct contact absorber with a liquid desiccant cycle to reduce the moisture content of the flue gas. The following discussion is intended to provide context for possible applications of the moisture reduction systems. Elements of the IGCC system 100 may include a fuel source 102, such as a solid feed, that may be utilized as a source of energy for the IGCC system 100. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshaped the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier 106 utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed "dirty syngas," since it contains, for example, $H_2S$. The gasifier 106 may also generate waste, such as slag 108, which may be a wet ash-based material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 3% CO, approximately 55% $H_2$, and approximately 40% $CO_2$ and is substantially stripped of $H_2S$. This clean syngas may be transmitted to a combustor 120, e.g., a combustion chamber, of a gas turbine engine 118 as combustible fuel. Alternatively, the $CO_2$ may be removed from the clean syngas prior to transmission to the gas turbine engine 118.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases. The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air received via the air intake of the compressor 132 may be received from an air cooing unit 133 (e.g., an air cooler). The cooled air may then be compressed by the compressor 132, and the compressed air may be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. By way of example, the second load 140 may also be an electrical generator for generating electrical power. However, both the first (134) and second (140) loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. Thus, it should be understood that the specific configuration of the steam turbine engine 136, as well as the gas turbine engine 118, may be implementation-specific and may include any combination of sections.

Additionally, heated exhaust gas 142 from the gas turbine engine 118 may be transported into the HRSG 138 and used to heat water and produce steam used to power the steam turbine engine 136. Further, exhaust from, for example, a low-pressure section of the steam turbine engine 136 may be directed into a condenser 144. The condenser 142 may utilize a cooling tower 146 to exchange heated water for chilled water. The cooling tower 146 acts to provide cool water to the condenser 144 to aid in condensing the steam transmitted to the condenser 144 from the steam turbine engine 136. Condensate from the condenser 144 may, in turn, be directed into the HRSG 138. Again, exhaust gases 142 from the gas turbine engine 118 may also be directed into the HRSG 138 to heat the water from the condenser 144 and produce steam.

In combined cycle systems such as IGCC system 100, hot exhaust 142 may flow from the gas turbine engine 118 and pass to the HRSG 138, where it may be used to generate high-pressure, high-temperature steam that may be used to further drive the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust (e.g. 146) heat from the topping cycle may be captured and used to generate steam for use in the bottoming cycle.

Additionally, a stream of flue gas, referred to by reference number 150, may also exit the HSRG 138. The flue gas 150 may be scrubbed in the scrubber 152 for removal of various pollutants and/or particulates. The scrubber 152 in the present embodiment may be a wet scrubbing system that removes particulates using a scrubbing solution (which may be water or a reagent). In other embodiments, the scrubber 152 could also be a dry scrubbing system. In embodiments where wet scrubbing is employed, the flue gas 154 exiting the scrubbing tower 152 may become further saturated with moisture. By way of example, the flue gas 150 entering the scrubbing tower 152 may have a moisture content of approximately 3 to 6 percent under normal combustion conditions. During post processing of the flue gas 150, such as via the scrubber 152 or by additional cooling, the moisture content of the flue gas 154 may increase to approximately 7 to 15 percent. To reduce this moisture content prior to releasing the flue gas 154 into the atmosphere, the saturated flue gas 154 may then be processed by the moisture removal system 156.

As discussed above, the moisture removal system 156 may utilize a direct contact absorber with a liquid desiccant solution cycle to reduce the moisture content of the flue gas 154.

These features will be shown in more detail below with reference to FIGS. 3-5. In operation, the flue gas 154 enters a direct contact absorber and flows across a plurality of hollow absorption tubes through which a liquid desiccant is circulated. As mentioned above, the hollow absorption tubes may include a porous membrane having a plurality of microscopic openings which may prevent the passage of liquid droplets (e.g., the liquid desiccant), but may allow for the passage of water vapor molecules in the flue gas stream 154. Thus, water vapor molecules that pass through the tube membranes may be absorbed by the liquid desiccant solution. By way of example, the liquid desiccant solution may be a salt solution, such as a lithium chloride or sodium chloride solution. The removal of water content by the moisture removal system 156 produces a "dry" flue gas 160, which may have a lower moisture content (e.g., approximately 1 to 6 percent) relative to the saturated flue gas 154. The dry flue gas 160 may then exit the power system 100 via the stack 162. As noted above, due the reduced moisture content of the dry flue gas 160, the visibility of a stack plume may be reduced or substantially eliminated.

The moisture removal system may also include a desiccant regeneration system. Thus, the wet liquid desiccant (e.g., saturated with absorbed water from the flue gas 154) may be processed by a regeneration system for recovery of the absorbed water, as indicated by block 158. The recovered water 158 may then be recycled back into the IGCC system 100. By way of example, in a 400 megawatt power system, water may be recovered at rate of approximately 100 to 350 gallons per minute. Additionally, while the moisture removal system 156 is described and shown in FIG. 1 as being configured to remove moisture from an exhaust stream, it should be appreciated that the moisture removal system 156 may also be configured to remove moisture on an intake stream, such as from the air/gas stream supplied to the compressor 132 of the gas turbine engine 118. Thus, it should be understood that the moisture removal system 156 may be disposed at different locations in the system 100, and that multiple moisture removal systems 156 may be utilized at various locations in the system 100.

Figure 2:
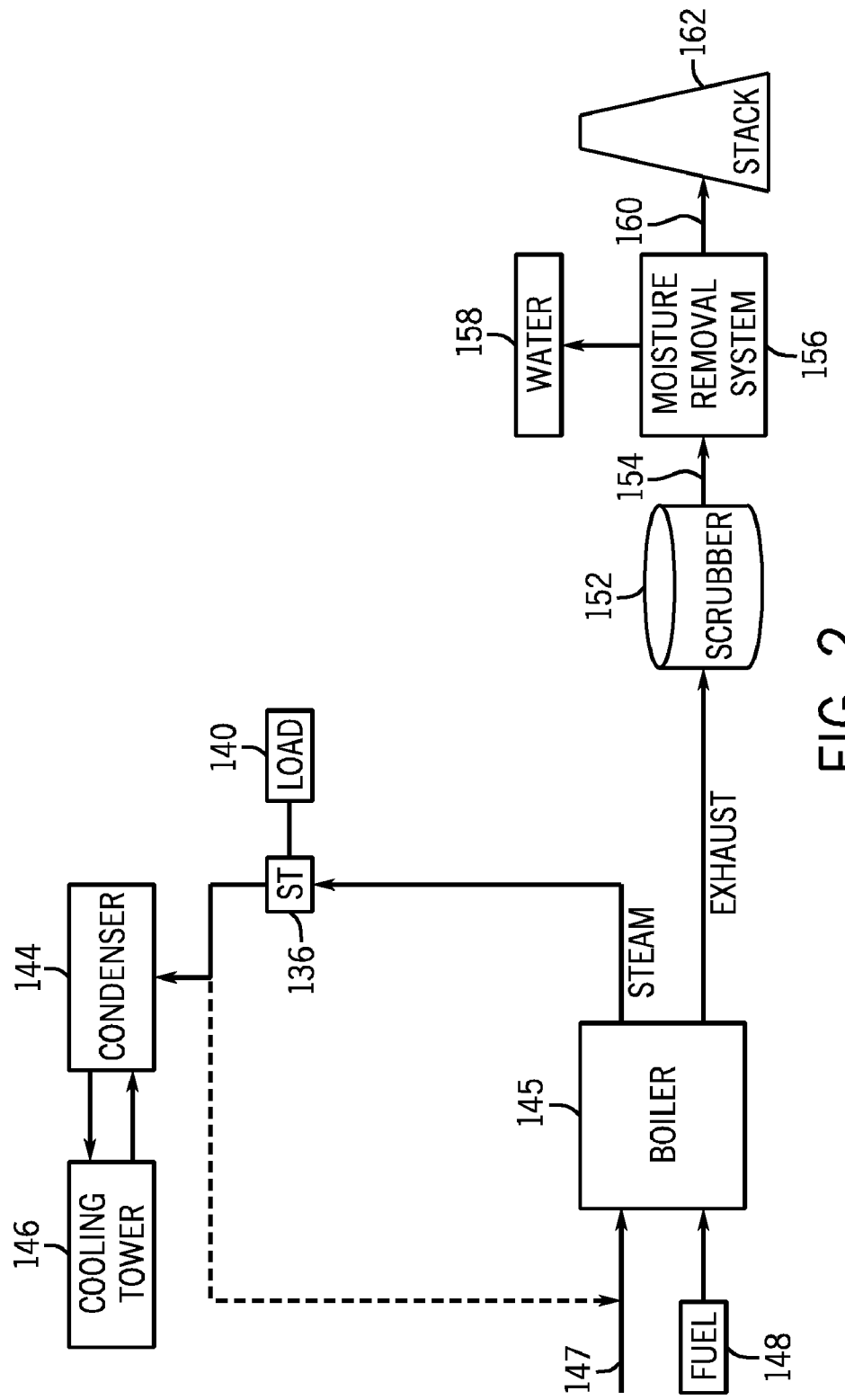
FIG. 2 is a schematic block diagram of a boiler-based power generation plant that may include a water reduction system, in accordance with an embodiment of the present technique.

FIG. 2 shows another embodiment of a power generation system that may include a boiler, referred to here by reference number 143. For instance, the power generation system 143 includes a boiler 145 which may be supplied with boiler feed water 147 and fuel 148. The fuel 148 may include coal, bio-fuel, heavy oil, waste products, and other combustible fuels. In embodiments where coal is utilized as the fuel 148, the boiler 145 may be referred to as a coal-fired boiler. The boiler feed water 147 may be treated water, such as de-mineralized water, and may include condensed steam returned from the steam turbine 136.

In the boiler 145, the fuel 148 (e.g., coal) is combusted, such as in a furnace of the boiler 145. Heat from the combustion vaporizes or boils the boiler feed water 147 in the boiler 145, and steam is generated and supplied to the steam turbine 136. As mentioned above, exhaust from, for example, a low-pressure section of the steam turbine engine 136 may be directed into a condenser 144. The condenser 142 may utilize a cooling tower 146 to exchange heated water for chilled water. The cooling tower 146 acts to provide cool water to the condenser 144 to aid in condensing the steam transmitted to the condenser 144 from the steam turbine engine 136.

Combustion exhaust 150 (i.e., flue gas) also exits from the boiler 145. The combustion exhaust 150 may include nitrogen, oxygen, $CO_2$, nitrogen oxides, sulfur oxides (e.g., $SO_2$), and/or particulate matter. By way of example, nitrogen oxides may be derived from the nitrogen in the ambient air used in the combustion and from any nitrogen-containing compounds in the fuel 148, whereas sulfur oxides are generally derived from sulfur-containing compounds in the fuel 148. The particulate matter may be composed of small particles of solid materials and small liquid droplets. The combustion exhaust may then be processed by the scrubber 152 and moisture removal system 156 in a manner similar to the process described in FIG. 1.

Figure 3:
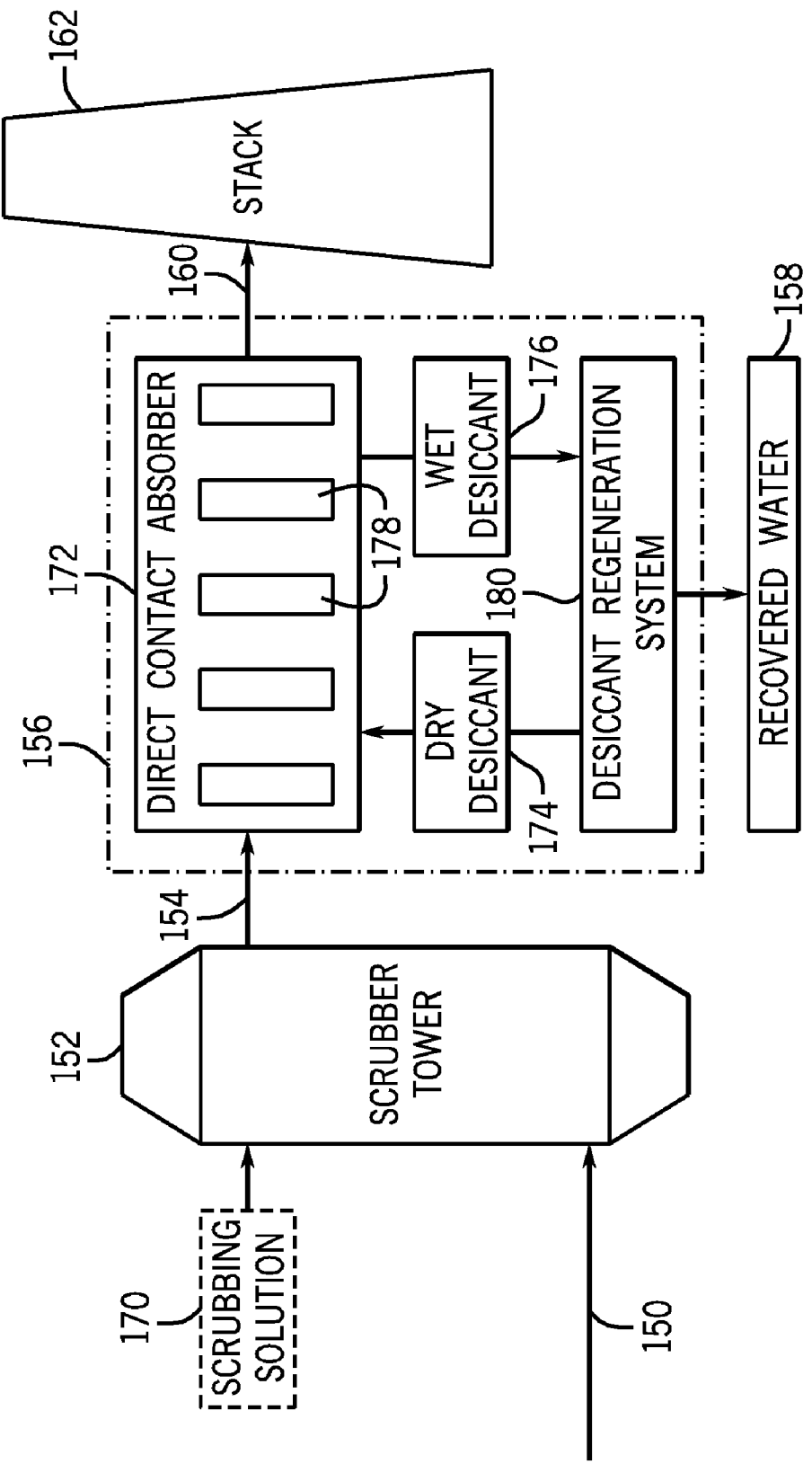
FIG. 3 is a block diagram depicting an embodiment of the water reduction system, as shown in FIGS. 1 and 2, that includes a direct contact absorber and a desiccant regeneration system.

FIG. 3 is a block diagram that shows the moisture removal system 156 of FIGS. 1 and 2 in more detail, in accordance with an embodiment of the invention. As shown in FIG. 3, the flue gas 150 from the HSRG 138 (FIG. 1) or boiler 145 (FIG. 2) is first scrubbed in the scrubber tower 152, which may be a wet scrubbing system. For instance, the wet scrubbing system may inject a scrubbing solution 170 into the flue gas stream 150 for removal of certain pollutants or particulates. In further embodiments, the scrubber 152 could also be a dry scrubbing system, or the system 100 may not include a scrubber 152 at all and, instead, the flue gas 150 from the HSRG 138 may flow directly to the moisture removal system 156. However, where wet scrubbing is employed, the flue gas 154 exiting the scrubbing tower may become further saturated with moisture. For instance, as mentioned above, the flue gas 150 entering the wet scrubber 152 may have a moisture content of approximately 3 to 6 percent under normal combustion conditions, whereas the moisture content of the flue gas 154 exiting the wet scrubber 152 may increase to approximately 7 to 15 percent due, at least in part, to saturation by a scrubbing solution 170. Thus, to reduce this moisture content, the saturated flue gas 154 may then be processed by the moisture removal system 156.

As shown in FIG. 3, the moisture removal system 156 includes a direct contact absorber 172. A liquid desiccant solution may circulate through the direct contact absorber, as indicated by the dry desiccant 174 entering the direct contact absorber 172 and the wet desiccant 176 exiting the direct contact absorber 172. As will be described in further detail below, the liquid desiccant may circulate through the direct contact absorber 172 by way of a plurality of hollow absorption tubes. In some embodiments, the direct contact absorber 172 may include thousands of such tubes, e.g., 1000, 1500, 2000, 2500, 3000, 3500, 4000, 4500, 5000 tubes or more, and may be arranged in bundles 178. As discussed above, the hollow absorption tubes may include a porous membrane having plurality of microscopic openings which may prevent the passage of liquid droplets (e.g., the liquid desiccant), but may allow for the passage of water vapor molecules in the flue gas stream 154. Thus, water vapor molecules that pass through the tube membranes may be absorbed by the liquid desiccant solution and carried away in the form of the wet desiccant 176 to a desiccant regeneration system 180. By way of example, the liquid desiccant may be a salt solution, such as a lithium chloride or sodium chloride solution.

The regeneration system 180 may be configured to remove the absorbed water 158 from the wet desiccant 176. For instance, the regeneration system 180 may utilize heat exchangers, vacuum domes, and/or condensers, to heat, separate, and recover the absorbed water 158 from the wet desiccant solution 176. Once the absorbed water 158 is separated, dry desiccant 174 may be directed back into the direct contact absorber 172, and the recovered water 158 may, in some embodiments, be supplied back to the power system 100 for use in cooling various components or gas streams. As discussed above, the removal of water 158 by the moisture removal system 156 produces a "dry" flue gas 160, which may have a lower moisture content (e.g., approximately 1 to 6 percent) relative to the saturated flue gas 154 (e.g., having approximately 7 to 15 percent moisture content). The dry flue gas 160 may then exit the power system 100 via the stack 162. Again, as mentioned above, due the reduced moisture in the dry flue gas 160, the visibility of a stack plume may be reduced or substantially eliminated.

As mentioned above, the direct contact absorber 172 may include thousands of hollow absorption tubes. The tubes 184, as shown in further detail in FIG. 4, may be arranged in a bundled arrangement 178. The tubes 184 may have a length, represented by reference number 185. In certain embodiments, the length 185 may be at least 1 meter or more. As will be appreciated, the quantity, length and diameter of the membrane tubes may be at least partially defined as a function of the flux rate of the membrane media. For instance, sufficient retention time should be furnished by the membrane absorber to allow transfer of the water vapor into the liquid desiccant. The retention time may be at least partially defined as a function of hollow tube diameter and length. Establishing this relationship allows the direct contact absorber to be of a size suitable for the available space.

The tubes 184 may include a porous membrane having a plurality of microscopic openings which may prevent the passage of liquid droplets (e.g., the liquid desiccant 174), but may allow for the passage of water vapor molecules in the flue gas stream 154. By way of example only, the membrane of the tubes 184 may be formed using expanded polytetrafluoroethylene. In one embodiment, the expanded polytetrafluoroethylene membrane may have approximately 8 to 9 billion pores per square inch, each of which is approximately 1/20,000 the size of a water droplet, making it generally impenetrable to liquid water while still allowing the smaller sized water vapor molecules in the flue gas 154 to pass through. Thus, water vapor molecules that pass through the tube membranes may be absorbed by the liquid desiccant solution and carried away in the form of the wet desiccant 176 to the desiccant regeneration system 180 (FIG. 3), as discussed above. In other embodiments, the concentration of the pores may vary, i.e., 500 million to 10 billion pores per square inch, with the understanding that the size of the pores prevents liquid droplets from passing through, but allows for the passage of vapor molecules.

Depending on the total number of tubes in the direct contact absorber 172, each bundle 178 may include hundreds or even thousands of tubes 184. For example, the direct contact absorber 172 may include anywhere from at least 5, 10, 15, 20, 25, 30, 35, 40, 45, 50 or more such bundles 178. As shown in FIG. 4, the dry desiccant solution 174 (flowing in direction 188) is received by a manifold 186, which may be configured to distribute the dry desiccant solution 174 to each of the tubes 184 in the bundle 178. As the dry desiccant 174 flows through the tubes, it absorbs water vapor molecules from the saturated flue gas 154, thus becoming saturated (e.g., wet desiccant 176). As discussed above with reference to FIG. 3, the wet desiccant 176 may be processed by a regeneration system 180 to separate the absorbed water 158 from the wet desiccant 176. For instance, as shown in FIG. 4, a second manifold 190, which may be similar to the manifold 186, may receive the wet desiccant flow from each of the tubes 184, and direct the combined wet desiccant flow 176 to the regeneration system 180. The regenerated dry desiccant 174 is then re-circulated through the direct contact absorber 172, and the process may continue. Further, due to the absorption of water vapor by the dry liquid desiccant 174, the flue gas 160 may exit the direct contact absorber 172 as a dry flue gas stream (e.g., having reduced moisture content).

Figure 4:
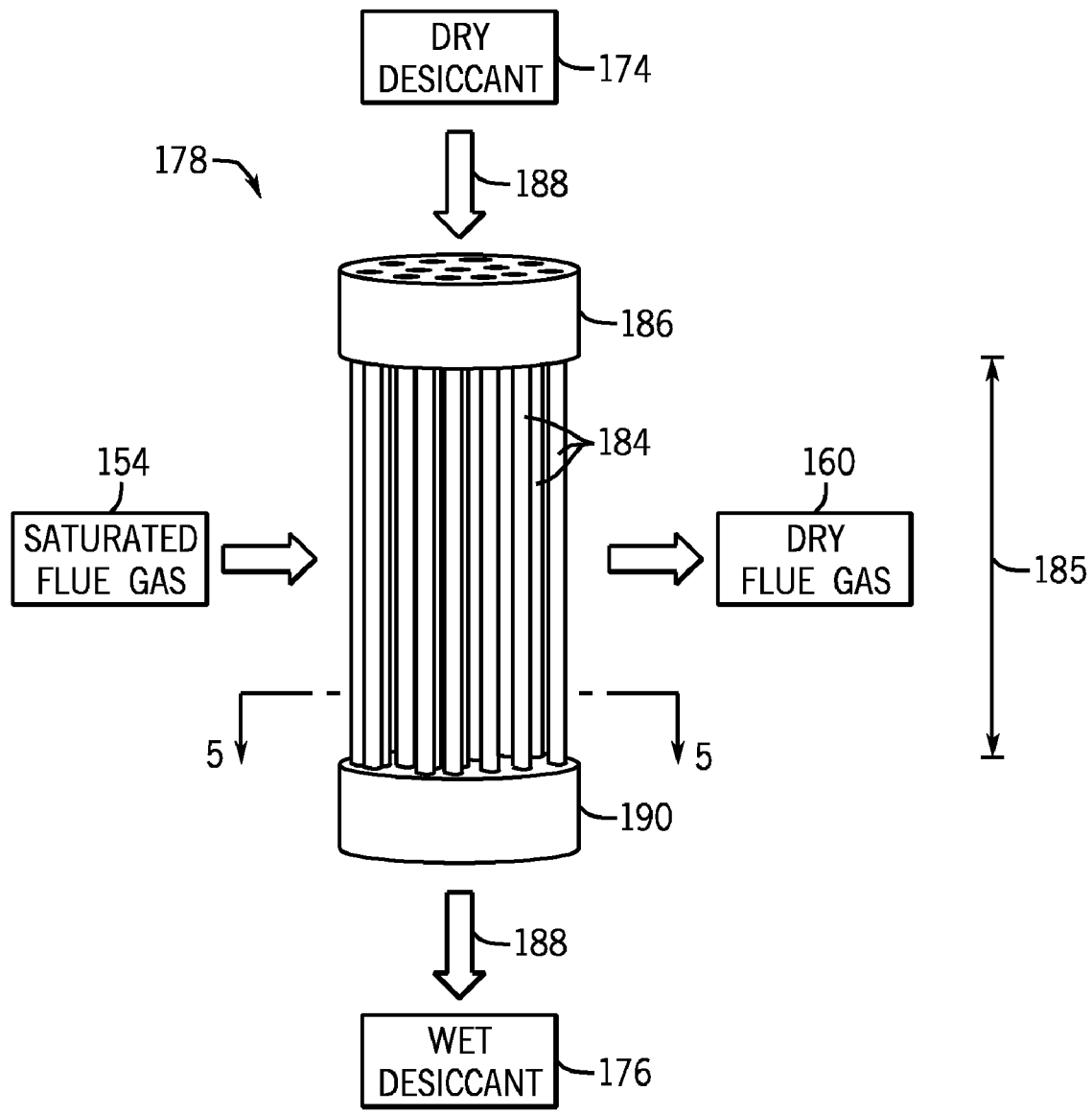
FIG. 4 shows a plurality of hollow tubes that may be used to circulate a liquid desiccant through the direct contact absorber of FIG. 3, in accordance with an embodiment of the present technique.

Referring now to FIG. 5, a partial cross-sectional view of the tubes 184 of the bundle 178, as taken along cut-line 5-5 of FIG. 4, is shown. The tubes 184 may be spaced apart in the x-direction 188 by the distance 186, and spaced apart in the y-direction 192 by the distance 191. In certain embodiments, the spacing distances 186 and 191 may be in a range from several microns to several inches. By way of example only, the distances 186 and 191 may be between approximately 100 microns to 12 inches or, more specifically, between approximately 1/32 inches to 6 inches, or even more specifically, between approximately 1/16 inches to 2 inches. Further, it should be understood that the distances 186 and 191 could be equal or different. In yet another embodiment, the tubes 184 may not be spaced apart (by distances 186 and 191), but may be positioned such that they are directly adjacent and contacting each other.

As further shown, the tubes 184 may have an inner diameter 194. In one embodiment, the inner diameter 194 may be between approximately 250 microns to 1 inch or, more specifically, 500 microns to 0.5 inches. Thus, as can be appreciated, the outer diameter 196 may be defined by the inner diameter 194 and the thickness 198 of the tube wall, which may be at least partially defined as a function of pore size and flux rate. Further, while the tubes 184 are generally shown in FIG. 5 as having the same dimensions, other embodiments may include tubes 184 having varying dimensions. Further, the gas velocity through the direct contact absorber 172 in some embodiments can range from 600 feet per minute to 1500 feet per minute. The velocity may be dependent on a target reduction in water vapor, the flux rate of the membrane, and/or the size of the absorber. As will be appreciated, site specific conditions may be utilized to establish the direct contact absorber geometry, which may vary from implementation to implementation.

As discussed above, each of the tubes 184 may include a membrane 200 having a plurality of microscopic holes. In one embodiment, the membrane 200 may be formed from expanded polytetrafluoroethylene, and may include approximately 8 to 9 billion pores per square inch, thus making it generally impenetrable to liquid water while still allowing the smaller sized water vapor molecules in the flue gas 154 to pass through. By way of example only, the size of the pores on the tubes 184 may have a diameter (assuming the pores are generally circular in shape) of approximately between 0.001 to 50 microns or, more specifically, 0.003 to 25 microns or, even more specifically, 0.005 to 10 microns. The membrane 200 may further be coated with a coating 202, which may be alkali in nature and/or serve as catalysts. For example the surface coating 202 could be a sodium or calcium material. In an alternative embodiment, a precious metal could serve as a catalyst. In yet a further embodiment, a carbon-based material may also be applied to the membrane 200. As will be appreciated, the material selected is dependent on the goal of the coating. The presently discussed techniques may cover more surface area and, as discussed above, may reduce the potential for corrosion of certain system components when compared to other techniques for moisture removal, such as direct spraying of a desiccant into the gas stream.

Referring now to FIG. 6, a flow chart depicting a method 210 for removing moisture from a gas stream is illustrated in accordance with an embodiment of the present invention. Beginning at step 212, a dry liquid desiccant circulated into a direct contact absorber 172. For instance, as discussed in the embodiments above, the dry liquid desiccant 174 may be circulated via a number of hollow absorption tubes 184. Next, at step 214, moisture from a flue gas stream (e.g., 154) flowing through the direct contact absorber 172 (e.g., across the tubes 184) may be absorbed into the liquid desiccant. For instance, water vapor molecules within the flue gas 154 may pass into the tubes 184 via microscopic holes. Thereafter, at step 216, the absorbed moisture may be removed from the liquid desiccant solution, for example, by a regeneration process (via regeneration system 180). As mentioned above, the regeneration process may involve heating the wet desiccant solution 176, and removing and/or separating the absorbed water content (e.g., 158). The liquid desiccant regeneration process can be integrated into existing plant heat sources to minimize the need for additional power. The recovered water 158 may be recycled back into the power system 100, such as for cooling purposes. Additionally, as shown at step 218, the regenerated dry desiccant may be re-circulated to the direct contact absorber 172, and the process may return to step 214 and continue.

Again, it should be understood that while the foregoing embodiments have focused on the removal of moisture from flue gas, the presently disclosed techniques may also be applied to the removal of moisture from other gas streams in a power generation system, such as the IGCC system 100 of FIG. 1, or the boiler system of FIG. 2. For instance, the direct contact absorber 172 and circulating liquid desiccant may also be used to remove moisture from intake air (e.g., entering the turbine 118), compressor air, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an exhaust gas treatment system, comprising:
a liquid desiccant solution; and
a direct contact absorber configured to circulate a flow of the liquid desiccant solution for absorbing moisture from an exhaust gas stream flowing through the direct contact absorber;
wherein the direct contact absorber comprises a hydrophilic porous membrane defining at least one flow path for the liquid desiccant solution, and the hydrophilic porous membrane comprises a plurality of pores configured to enable a selective permeation of water vapor molecules from the exhaust gas stream and into the at least one flow path for absorption by the liquid desiccant solution, and the plurality of pores is configured to block the liquid desiccant solution from exiting the at least one flow path through the hydrophilic porous membrane.

2. The system of claim 1, wherein the liquid desiccant solution is a salt solution.

3. The system of claim 1, wherein the porous membrane comprises between approximately 500 million to 10 billion pores per square inch of area.

4. The system of claim 1, wherein the porous membrane comprises expanded polytetrafluoroethylene.

5. The system of claim 1, comprising a regeneration system configured to separate the absorbed moisture from the liquid desiccant solution, and to re-circulate the liquid desiccant solution through the direct contact absorber.

6. The system of claim 5, wherein the regeneration system comprises a heat exchanger, a condenser, or a combination thereof.

7. The system of claim 1, comprising a turbine component configured to produce the exhaust gas stream.

8. The system of claim 1, wherein absorbing moisture from the exhaust gas stream reduces the composition of the moisture in the exhaust gas stream to between approximately 1 to 6 percent.

9. A system, comprising:
a component configured to produce an exhaust flow into a flue;
a liquid desiccant solution; and
a direct contact absorber comprising a plurality of hollow tubes, wherein the liquid desiccant solution flows through each of the plurality of hollow tubes to remove moisture from the exhaust flow;
wherein each of the plurality of hollow tubes comprises a hydrophilic porous membrane comprising a plurality of pores configured to enable a selective permeation of water vapor molecules from the exhaust flow and into the liquid desiccant solution, and the plurality of pores is configured to block the liquid desiccant solution from exiting the plurality of hollow tubes through the hydrophilic porous membrane.

10. The system of claim 9, wherein the porous membrane comprises expanded polytetrafluoroethylene.

11. The system of claim 9, wherein the plurality of hollow tubes are grouped into one or more bundles within the direct contact absorber, wherein the one or more bundles comprises a first bundle of hollow tubes having a manifold fluidly coupled to respective first ends of each of the first bundle of hollow tubes, wherein the manifold is configured to distribute the liquid desiccant solution to each of the first bundle of hollow tubes.

12. The system of claim 9, wherein the component comprises a turbine engine, a boiler, or a furnace, or any combination thereof.

13. The system of claim 9, wherein each of the plurality of hollow tubes has in inner diameter of between approximately 500 microns to 0.5 inches.

14. The system of claim 9, wherein each of the hollow tubes is coated with a sodium-based material, a calcium-based material, or a combination thereof.

15. A method, comprising:
flowing an exhaust gas stream through a direct contact absorber comprising a plurality of hollow members each having a respective hydrophilic porous membrane comprising a plurality of pores;
circulating a liquid desiccant solution through an interior of each hollow member of the plurality of hollow members of the direct contact absorber while blocking the liquid desiccant from exiting each hollow member through the hydrophilic porous membrane;
passing water vapor contained within the exhaust gas stream into the interior of at least one of the plurality of hollow members through its respective hydrophilic porous membrane; and
absorbing the water vapor using the liquid desiccant solution.

16. The method of claim 15, comprising:
regenerating the liquid desiccant solution; and
re-circulating the regenerated liquid desiccant solution through the direct contact absorber.

17. The method of claim 16, wherein regenerating the liquid desiccant solution comprises heating the liquid desiccant solution and removing the absorbed moisture from the liquid desiccant solution.

18. The method of claim 17, comprising returning the removed moisture to a power generation system.

19. The system of claim 1, wherein the pores each have a diameter between approximately 0.001 microns and approximately 50 microns.

20. The system of claim 9, wherein the pores each have a diameter between approximately 0.001 microns and approximately 50 microns.

21. A system, comprising:
   a scrubbing system, comprising:
      a wet scrubber configured to receive an exhaust gas stream from a combustion system, wherein the wet scrubber is configured to scrub the exhaust gas stream with a scrubbing solution comprising water such that the exhaust gas stream becomes saturated with moisture; and
   an exhaust gas treatment system, comprising:
      a liquid desiccant solution; and
      a direct contact absorber configured to circulate a flow of the liquid desiccant solution for absorbing moisture from the exhaust gas stream flowing through the direct contact absorber;
      wherein the direct contact absorber comprises a hydrophilic porous membrane defining at least one flow path for the liquid desiccant solution, and the hydrophilic porous membrane comprises a plurality of pores configured to enable a selective permeation of water vapor molecules from the exhaust gas stream and into the at least one flow path for absorption by the liquid desiccant solution, and the plurality of pores is configured to block the liquid desiccant solution from exiting the at least one flow path through the hydrophilic porous membrane.

* * * * *